(12) United States Patent
Zhang et al.

(10) Patent No.: US 7,871,706 B2
(45) Date of Patent: *Jan. 18, 2011

(54) GRADED GLASS/ZIRCONIA/GLASS STRUCTURES FOR DAMAGE RESISTANT CERAMIC DENTAL AND ORTHOPEDIC PROSTHESES

(75) Inventors: Yu Zhang, Chatham, NJ (US); Jae-Won Kim, Elmhurst, NY (US)

(73) Assignee: New York University, New York, NY (US)

( * ) Notice: Subject to any disclaimer, the term of this patent is extended or adjusted under 35 U.S.C. 154(b) by 156 days.

This patent is subject to a terminal disclaimer.

(21) Appl. No.: 11/983,815

(22) Filed: Nov. 9, 2007

(65) Prior Publication Data

US 2008/0241551 A1 Oct. 2, 2008

(51) Int. Cl.
*B32B 17/06* (2006.01)
(52) U.S. Cl. ............... 428/432; 428/426; 428/428
(58) Field of Classification Search ............. 428/426, 428/432, 428
See application file for complete search history.

(56) References Cited

U.S. PATENT DOCUMENTS 6,641,893 B1 * 11/2003 Suresh et al. ............... 428/105
2003/0029910 A1 * 2/2003 Goretta et al. ............ 228/248.1

OTHER PUBLICATIONS

Kim et al. (2007) *Journal of Dental Research* 86(11): 1046-1050.
Lawn et al. (2001) *The Journal of Prosthetic Dentistry* 86(5): 495-510.
Zhang et al. (in press) "Fatigue Damage in Ceramic Coatings from Cyclic Contact Loading with Tangential Component." *Journal of the American Ceramic Society*.
Fradeani et al. (1997) *Int. J. Prothodont.* 10: 241-7.
Malament et al. (1999) *J. Prosthet. Dent.* 81: 23-32.
Sjogren et al. (1999) *Int. J. Prosthodont.* 12: 122-8.
Sailer et al. (2006) *Quintessence International* 37(9): 685-693.
Sailer et al. (2007) *Clin. Oral Impl. Res.* 18(3): 86-96.
Pjetursson et al. (2007) *Clin. Oral Impl. Res.* 18(3): 73-85.
Burke et al. (2002) *J Adhes Dent* 4(1): 7-22.
Kelly (1997) *Annual Reviews of Materials Science* 27: 443-68.
Kelly (2004) *Dent. Clin. N. Am.* 48: 513-30.

(Continued)

*Primary Examiner*—Gwendolyn Blackwell
(74) *Attorney, Agent, or Firm*—Klauber & Jackson LLC

(57) ABSTRACT

The present invention provides a functionally graded glass/ceramic/glass sandwich system for use in damage resistant, ceramic and orthopedic prosthesis. The functionally graded glass/substrate/glass composite structure comprises an outer residual glass layer, a graded glass-ceramic layer, and a dense interior ceramic. The functionally graded glass/substrate/glass composite structure may further comprise a veneer on an exterior surface.

The present invention also provides a method for preparing a functionally graded glass/ceramic/glass sandwich system. A powdered glass-ceramic composition is applied to the accessible surfaces of a presintered zirconia substrate to thereby substantially cover the substrate surfaces. The glass of the composition has a CTE similar to that of the substrate material. The glass-ceramic composition is infiltrated into and densifies the substrate by heating the assembly to at least the sintering temperature of the substrate.

8 Claims, 7 Drawing Sheets

OTHER PUBLICATIONS

McLean, J. W. (1979) *The Science and Art of Dental Ceramics*. Chicago, Quintessence Publishing Co. Inc.
Binns, D. (1983) *The Chemical and Physical Properties of Dental Porcelain*. Chicago, Quintessence Publishing Co. Inc.
Van, N. R. (2002). "An Introduction to Dental Materials." 231-46.
McLean et al. (1965) *Br. Dent. J.* 119: 251-67.
Denry (1996) *Crit. Rev. Oral. Biol. Med.* 7: 134-43.
Sozio et al. (1983). *J. Prosthet. Dent.* 69: 1982-5.
Bieniek et al. (1994). *Schweitz Monatsschr Zahnmed* 104: 284-9.
Probster (1992) *Int J Prosthodont* 5(5): 409-14.
Anderson et al. (1993). *Acta Odontol Scand* 51: 59-64.
Donovan (2005) *Journal of Esthetic and Restorative Dentistry* 17(3): 141-3.
Zhang et al. (2004) *Journal of Biomedical materials research* 71B(2): 381-6.
Zhang et al. (2005) *Journal of Biomedical materials research* 72B: 388-92.
Zhang et al. (2006) *The International Journal of Prosthodontics* 19(5): 442-8.
Suresh et al. (1997) *Acta Materialia* 45(4): 1307-21.
Jitcharoen et al. (1998) *Journal of the American Ceramic Society* 81(9): 2301-8.
Suresh et al. (1999) *Acta Materialia* 47(14): 3915-3926.
Kim, et al. (2006) *J Biomed Mater Res B Appl Biomater* 79(1): 58-65.
Piascik et al. (2006) *J. Vac. Sci. Technol. A* 24(4) 1091-5.
Guazzato et al. (2004) *Dental Materials* 20: 449-456.
Guazzato et al. (2004) *Biomaterials* 25: 5045-5052.
Jung et al. (2000) *Journal of Dental Research* 79(2): 722-31.
Stappert et al. (2005) *Journal of Prosthetic Dentistry* 94(2): 132-139.
Zhang et al. (2004) *Journal of Biomedical Materials Research* 69B: 166-72.
Zhang et al. (2005) *Journal of Materials Research* 20(8): 2021-9.
Sundh et al. (2004) *Journal of Oral Rehabilitation* 31(7): 682-8.
Vult von Steyern et al. (2006) *Journal of Oral Rehabilitation* 33(9): 682-9.
Wood et al. (2006) *J. Prosthet. Dent.* 95(1): 33-41.
Chevalier (2006) *Biomaterials* 27: 534-43.
Chevalier et al. (1999) *Journal of the American Ceramic Society* 82(8): 2150-4.
B. Kim et al, (2007) *Journal of Dental Research*, 86(2): 142-146.

\* cited by examiner

GRADED GLASS/ZIRCONIA/GLASS STRUCTURES FOR DAMAGE RESISTANT CERAMIC DENTAL AND ORTHOPEDIC PROSTHESES

FIELD OF THE INVENTION

The present invention relates to dental and orthopedic prostheses and methods for producing improvements in dental and orthopedic prostheses using functionally graded materials ("FGMs") such as a functionally graded glass/zirconia/glass (G/Z/G) sandwich material.

BACKGROUND OF THE INVENTION

Teeth play a critically important role in our lives. Loss of function reduces the ability to eat a balanced diet which results in negative consequences for systemic health. Loss of aesthetics can negatively impact social function. Both function and aesthetics can be restored with dental crowns and bridges. Ceramics are attractive dental restoration materials because of their aesthetics, inertness, and biocompatibility. However, ceramics are brittle and subject to premature failure, especially after repeated contact including slide-liftoff masticatory loading in a moist environment (Kim et al. (2007) *Journal of Dental Research* 86(11): 1046-1050; Lawn et al. (2001) *The Journal of Prosthetic Dentistry* 86(5): 495-510; Lawn et al. (2001) *J Prosthet Dent* 86(5): 495-510; Zhang et al. (in press) "Fatigue Damage in Ceramic Coatings from Cyclic Contact Loading with Tangential Component." *Journal of the American Ceramic Society*) Fracture rates of ceramic restorations may seem low at 3-4% per year (Fradeani et al. (1997) *Int. J. Prothodont.* 10: 241-7; Malament et al. (1999) *J. Prosthet. Dent.* 81: 23-32; Sjogren et al. (1999) *Int. J. Prosthodont.* 12: 122-8; Sailer et al. (2006) *Quintessence International* 37(9): 685-693; Sailer et al. (2007) *Clin. Oral Impl. Res.* 18(3): 86-96; Pjetursson et al. (2007) *Clin. Oral Impl. Res.* 18(3): 73-85). However, failure can cause significant patient discomfort and loss of productive lifestyle. The vulnerability of dental ceramic restorations is exacerbated by damage, fatigue loading, and moisture.

According to a survey conducted by American Dental Association, more than 45 million new dental crowns, of which over 37 million were porcelain (ceramic) based, were provided by dentists in 1999 (ADA (2002). "The 1999 Survey of Dental Services Rendered."). As the population ages, the number will increase. Despite continuous efforts to improve the strength of dental ceramics, all-ceramic dental crowns continue to fail at a rate of approximately 3-4% each year (Burke et al. (2002) *J. Adhes Dent* 4(1): 7-22). The highest fracture rates are on posterior crowns and bridges where stresses are greatest. Dental crowns generate over $2 billion each year in revenues with 20% of the units being all-ceramic (Nobel Biocare 2004). Dental ceramics that best mimic the optical properties of enamel and dentin are predominantly glassy materials principally feldspar (a group of minerals having main constituents of silica and alumina) (Kelly (1997) *Annual Reviews of Materials Science* 27: 443-68; Kelly (2004) *Dent. Clin. N. Am.* 48: 513-30). The original dental porcelain contained high feldspathic glass content and was extremely brittle and weak (S(strength) approximately ~60 PMa) (McLean, J. W. (1979) *The Science and Art of Dental Ceramics*. Chicago, Quintessence Publishing Co. Inc.; Binns, D. (1983) *The Chemical and Physical Properties of Dental Porcelain*. Chicago, Quintessence Publishing Co. Inc.). Therefore, despite the aesthetic advantage, the early porcelain crowns were not widely used in dentistry (Van, N. R. (2002). "An Introduction to Dental Materials." 231-46).

Dental ceramics have become increasingly popular as restorative materials due to improvements in strength. Several methods have been developed to improve the strength of dental ceramics including adding uniformly disperse appropriate filler particles throughout a glass matrix, referred to as "dispersion strengthening" (McLean et al. (1965) *Br. Dent. J.* 119: 251-67). The first fillers used in dental ceramics were leucite particles (Denry (1996) *Crit. Rev. Oral. Biol. Med.* 7: 134-43). Commercial dental ceramics containing leucite as a dispersion strengthening fillers include IPS Empress (S~120 PMa) (Ivoclar-Vivadent, Schaan, Liechtenstein) and Finesse All-ceramic (S approximately 125 MPa) (Dentsply Prosthetics, York, Pa.). Particle strengthening can also be achieved by heat-treating the glass to facilitate the precipitation and subsequent growth of crystallites within the glass, termed "ceraming". Dental ceramics produced using the ceraming process are called glass-ceramics. Several commercial products such as Dicor (S~160 MPa) (Dentsply), IPS Empress II (S~350 MPa) (Ivoclar-Vivadent) and, more recently, IPS e.max Press (S~525 MPa) (Ivoclar-Vivadent) are examples. The leucite-strengthened porcelains and the glass-ceramics are translucent, so single layer (monolithic) crowns can be made from these materials. However, only moderate strength increases can be achieved via the particle strengthening techniques. Therefore, monolithic ceramic crowns experience high failure rates range from 4-6% for Dicor molar crowns (Malament et al. (1999) *J. Prosthet. Dent.* 81: 23-32) and 3-4% per year for IPS Empress crowns (Fradeani et al. (1997) *Int. J. Prothodont.* 10: 241-7; Sjogren et al. (1999). *Int. J. Prosthodont.* 12: 122-8). Note: comprehensive clinical reports on the new IPS e.max Press crowns are not available at this stage.

The current approach to the fracture problem of monolithic crowns is a layer-structure with aesthetic but weak porcelain veneers fused onto strong but opaque ceramic cores. This involves an increase in crystalline content (from approximately 40 vol % to 99.9 vol %) accompanied by a reduction in glass content. The first successful strengthened core ceramic was made of feldspathic glass filled with approximately 40 vol % alumina particles (McLean et al. (1965). *Br. Dent. J.* 119: 251-67). The alumina fillers increased the flexural strength of the ceramic to approximately 120 MPa with a trade off in translucency; hence veneering was required. Using McLean's approach, in 1983 Coors Biomedical (Golden, Colo.) developed Cerestore all-ceramic crowns with a ceramic core containing ~60 vol % of alumina (Sozio et al. (1983). *J. Prosthet. Dent.* 69: 1982-5). However, following problems with fractured crowns the manufacturer withdrew the system. A similar product from the same era, the Hi-Ceram crown (Vita, Bad Säckingen, Germany) with its core material containing about the same amount of alumina as the Cerestore core, also failed to meet the satisfactory for posterior restorations (Bieniek et al. (1994). *Schweitz Monatsschr Zahnmed* 104: 284-9). The Hi-Ceram crown was replaced by In-ceram crown (Vita) in 1990. The In-ceram crown had a core that was fabricated by lightly sintering an alumina powder compact and then infiltrating the still porous alumina matrix with a low viscosity glass. The final core material contained approximately 70 vol % of alumina and had a flexural strength of approximately 450 MPa (Probster (1992) *Int J Prosthodont* 5(5): 409-14). In 1993, Procera (Nobel Biocare, Göteborg, Sweden) presented the all-ceramic crown concept (Anderson et al. (1993). *Acta Odontol Scand* 51: 59-64), where the fully dense core material contained 99.9 vol % alumina and displayed a flexural strength of 675 MPa.

Several years later, even stronger Y-TZP ceramic was introduced to dentistry as a core material with a flexural strength over 1200 MPa.

Although documentation regarding the clinical performance of the zirconia core backed crowns is still limited, laboratory in vitro tests (B. Kim et al, (2007) *Journal of Dental Research*, 86(2): 142-146) and anecdotal clinical reports (Donovan (2005) *Journal of Esthetic and Restorative Dentistry* 17(3): 141-3.) indicate that the zirconia cores are very fracture resistant. However, a frequent problem is fracture of the porcelain veneer. Despite significant improvements in the performance of existing dental ceramics, the structural stability of all-ceramic systems remains less reliable than metal-ceramic systems (porcelain veneers fused onto metal copings) (Kelly (2004) *Dent. Clin. N. Am.* 48: 513-30). While efforts in improving the structural performance of all-ceramic crowns have been focused on making monolithic materials stronger or fabricating stronger cores to support weak, but aesthetic porcelain veneers, few innovative approaches have emerged to develop more damage resistant and longer lasting ceramic crowns. This is due in part to the lack of current knowledge of damage modes that could occur in a ceramic crown under mastication.

Unfortunately, no current materials, including monolithic ceramics stronger (orthopedic and dental prostheses) or strong cores to support weak, but aesthetic porcelain veneers (dental prostheses) can effectively suppress both contact and flexural damages. In addition, veneered strong ceramic dental prostheses have a dense, high purity crystalline structure at the cementation internal surface that cannot be readily adhesively bonded to tooth dentin as support. Surface roughening treatment such as particle abrasion is commonly used to enhance the ceramic-luting agent bond. However, particle abrasion also introduces surface flaws or microcracks that can cause deterioration in the long-term flexural strength of ceramic prostheses. (Zhang et al. (2004) *Journal of Biomedical materials research* 71B(2): 381-6; Zhang et al. (2005) *Journal of Biomedical materials research* 72B: 388-92; Zhang et al. (2006) *The International Journal of Prosthodontics* 19(5): 442-8).

Recent advances in theoretical and experimental work have shown that functionally graded materials, referred to as FGMs, may provide unprecedented resistance to contact damage (Suresh et al. (2003) U.S. Pat. No. 6,641,893; Suresh et al. (1997) *Acta Materialia* 45(4): 1307-21; Jitcharoen et al. (1998) *Journal of the American Ceramic Society* 81(9): 2301-8; Suresh et al. (1999) *Acta Materialia* 47(14): 3915-3926). Such damage resistance cannot be realized with conventional homogeneous materials. FGMs are made of two materials that are combined so that the surface of the FGM is composed entirely of material A, and the interior is composed entirely of material B. Additionally, there is a continuous change in the relative proportions of the two materials from the surface to interior. One known FGM is a thick ceramic block, alumina or silicon nitride, infiltrated with a low elastic modulus aluminosilicate glass or oxynitride glass (SiAlYON), respectively, on one surface to produce a graded glass/ceramic (G/C) structure that suppresses contact damage at the top, occlusal surface (Jitcharoen et al. (1998) *Journal of the American Ceramic Society* 81(9): 2301-8). However, upon infiltration of dense ceramics, the glass penetrates the grain boundaries and grain boundary triple junctions, and as a result, the ceramic grains gradually separate. This leads to an increase in volume at the surface of graded structure and is accompanied by warpage or bending of the specimens where the glass-impregnated surface is convex.

Zirconium dioxide ($ZrO_2$), sometimes known as zirconia, is a white crystalline oxide of zirconium. Its most naturally occurring form, with a monoclinic crystalline structure, is the rare mineral, baddeleyite. Pure $ZrO_2$ has a monoclinic crystal structure at room temperature and transitions to tetragonal and cubic at increasing temperatures. The volume expansion caused by the cubic to tetragonal to monoclinic transformation induces very large stresses, and will cause pure $ZrO_2$ to crack upon cooling from high temperatures. Several different oxides are added to zirconia to stabilize the tetragonal and/or cubic phases: magnesium oxide (MgO), yttrium oxide, ($Y_2O_3$), calcium oxide (CaO), and cerium oxide ($Ce_2O_3$), amongst others.

If sufficient quantities of the metastable tetragonal phase zirconia is present, then an applied stress, magnified by the stress concentration at a crack tip, can cause the tetragonal phase to convert to monoclinic, with the associated volume expansion. This phase transformation can then put the crack into compression, retarding its growth, and enhancing the fracture toughness. This mechanism is known as transformation toughening, and significantly extends the reliability and lifetime of products made with partially stabilized zirconia. A special case of zirconia is that of tetragonal zirconia polycrystaline or TZP, which is indicative of polycrystalline zirconia composed of only the metastable tetragonal phase. This material is also used in the manufacture of frameworks for the construction of dental restorations such as crowns and bridges which are then veneered with a dental feldspathic porcelain, as well as femoral heads for the total hip replacement.

SUMMARY OF INVENTION

The present invention takes advantage of the discovery that fracture problems of ceramic prostheses are minimized by a new generation of damage resistant ceramic prostheses utilizing functionally graded materials (FGMs). The present invention represents an improvement over the G/C structure of the prior art to a graded G/C/G structure by infiltrating top and bottom ceramic surfaces with glass. The present invention features a structure of G/C/G comprising an outer surface aesthetic residual glass layer, a graded glass-ceramic layer, and a dense interior ceramic.

In a first aspect, the present invention provides a method for preparing a functionally graded glass/ceramic/glass (G/C/G), preferably a functionally graded glass/zirconia/glass (G/Z/G) sandwich material, comprising: (a) applying a powdered glass-ceramic composition to accessible surfaces of a presintered zirconia substrate thereby covering the zirconia substrate surfaces with a layer of the composition wherein the coefficient of thermal expansion (CTE) of the glass-ceramic and the coefficient of thermal expansion (CTE) of the substrate material are substantially the same; and (b) infiltrating the glass-ceramic composition into the substrate and densifying the substrate by heating the substrate. In some embodiments, the heating is performed to approximately the sintering temperature of the substrate.

In some embodiments, the substrate comprises yttria-tetragonal zirconia polycrystal (Y-TZP). In other embodiments, the substrate is presintered at a temperature of from about 900° C. to about 1400° C. In yet other embodiments, the densifying is performed in one or more firing cycles at a temperature of from about 1200° C. to 1550° C., or 1300° C. to 1500° C., preferably from about 1400° C. to 1450° C. Also, in some embodiments, the powdered glass-ceramic composition is dispersed in an aqueous based solution. It is preferred that the powdered glass-ceramic composition comprises one or more oxides selected from the group consisting of $SiO_2$, $AL_2O_3$, $K_2O$, $Na_2O$, $BaO$, $Tb_4O_7$, and $CaO$. Each of the one or more oxides may be present in a weight percent of about 1%, 2%, 5%, 10%, 15%, 20%, 25%, 30%, or even 50%. In some embodiments only of the oxides is present, while in other embodiments, two, three, four, five, six, seven or even eight of the oxides may be present. Also, in particularly preferred embodiments, the CTE of the glass and the CTE of the zirconia are substantially the same. That is, when the CTEs are substantially the same, in some embodiments, the CTE of the glass and the CTE of the zirconia are within about 50%, 40%, 30%, 25%, 20%, 10%, 5%, 2%, 1% or even 0.5% or 0.25% of each other. In especially preferred embodiment, the CTE of the glass is approximately about 10.0 to 11.0, or 10.3 in/in/° C., from 0 to 430° C., and the CTE of the zirconia is approximately about 10.0 to 11.0, or 10.3 in/in/° C., from 0 to 430° C. In some embodiments, the presintered zirconia substrate is presintered by a microwave technique, and in some embodiments, the glass/zirconia/glass (G/Z/G) sandwich material is densified by a microwave technique.

In a second aspect, the present invention provides a functionally graded glass/ceramic/glass composite structure comprising an outer residual glass layer, an underlying graded glass-ceramic layer, and a dense interior ceramic. In some embodiments, the functionally graded glass/ceramic/glass composite structure is substantially non-susceptible to warpage or bending. The functionally graded glass/zirconia/glass (G/Z/G) sandwich material may be produced in some instances by the method described above as a first aspect of the invention.

In some embodiments, the functionally graded glass/ceramic/glass composite structure is composed of an underlying ceramic made substantially of yttria-tetragonal zirconia polycrystal (Y-TZP). In some embodiments, the CTE of the glass and the CTE of the zirconia are substantially the same. That is, when the CTEs are substantially the same, in some embodiments, the CTE of the glass and the CTE of the zirconia are within about 50%, 40%, 30%, 25%, 20%, 10%, 5%, 2%, 1% or even 0.5% or 0.25% of each other. In especially preferred embodiment, the CTE of the glass is approximately about 8.0 to 15.0, 10.0 to 11.0, or 10.3 in/in/° C., from 0 to 430° C., and the CTE of the zirconia is approximately about 8.0 to 15.0, 10.0 to 11.0, or 10.3 in/in/° C., from 0 to 430° C.

In some embodiments, the outer glass layer may be from 5 to 1,000 microns thick, sometimes 10 to 750 microns thick, or 20 to 500 microns thick, or 25 to 250 microns thick, or 30 to 100 microns thick, for instance. Likewise, in some embodiments, the graded glass-ceramic layer may be from 10 to 500 microns thick, or 20 to 300 microns thick, or 30 to 200 microns thick, or 40 to 150 microns thick, or 50 to 125 microns thick, or 60 to 100 microns thick, for instance.

In a third aspect, the present invention provides a prosthesis comprising a functionally graded glass-ceramic/ceramic/glass-ceramic composite structure or a graded glass-ceramic/ceramic structure. The prosthesis may be, for instance, an aesthetic and damage-resistant ceramic orthopedic prosthesis, orthopedic stems, orthopedic/dental anchors, orthopedic/dental implants, dental prostheses, and endodontic posts. The structure may comprise an outer residual low modulus glass layer, an underlying graded glass-ceramic layer, and a dense interior ceramic.

DETAILED DESCRIPTION OF THE INVENTION

Figure 1:
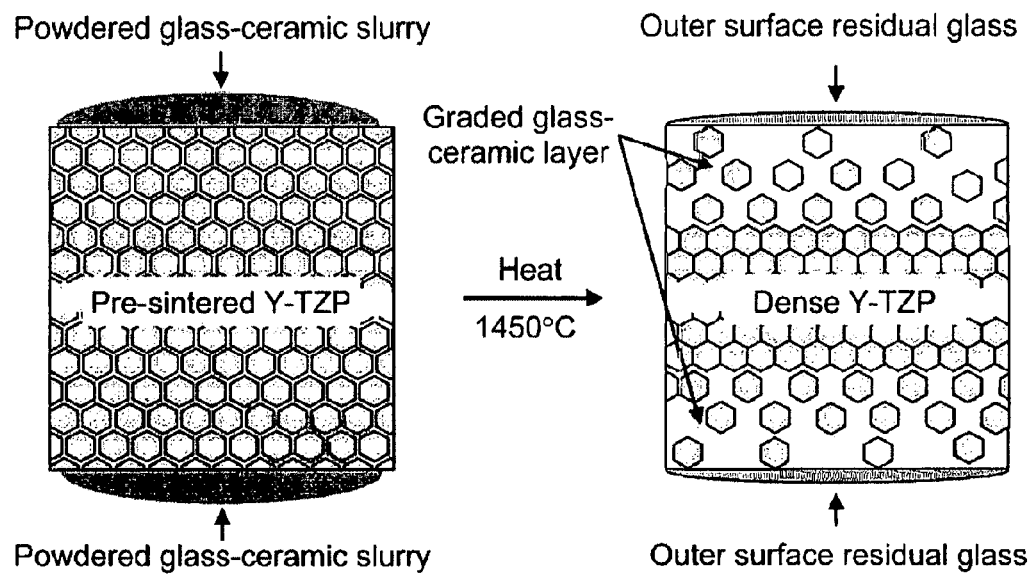
FIG. 1 is a schematic diagram illustrating a preferred processing method for the fabrication of a flat G/Z/G composite.

An FGM structure where a thick ceramic block, alumina or silicon nitride, is infiltrated with a low elastic modulus aluminosilicate glass or oxynitride glass, respectively, on one surface to produce a graded glass/ceramic (G/C) structure that suppresses contact damage at the top, occlusal surface is known in the art. (Jitcharoen et al. (1998) *Journal of the American Ceramic Society* 81(9): 2301-8) The present invention provides a graded G/C/G structure by infiltrating top and bottom ceramic surfaces with glass. The G/C/G structure suppresses both occlusal surface contact damage and cementation internal surface flexural damage. In addition, the unique structure of G/C/G, an outer surface aesthetic residual glass layer, a graded glass-ceramic layer, and a dense interior ceramic (FIG. 2), allows optimizing optical and cementation properties.

The FGM structure of the present invention having a low modulus glass ceramic at both the top and the bottom surfaces, sandwiching a high modulus, strong ceramic interior, improves resistance to both contact and flexural damage. In addition, the FGM structure of the present invention together with outer surface residual glass layers may be used to enhance the aesthetics and cementation behavior of polycrystalline dental ceramic cores, including the exceptionally strong class of zirconia ceramics. Moreover, it is possible to optimize the thickness of the surface graded layer and residual glass layer thereby providing the best combination of aesthetics, resistance to contact damage and flexural fracture for G/C/G FGMs.

Glass-ceramic powders are taught in U.S. Provisional Patent Application Ser. No. 60/860,165, the disclosure of which is herein incorporated by reference in its entirety. The present invention provides G/Z/G structures having a thickness useful for dental applications. In many embodiments, the glass-ceramic powders used for infiltrating G/Z/G contain one or more of, but are not restricted to, the following main oxides (i.e. at 1.0 weight percent or more): $SiO_2$, $Al_2O_3$, $K_2O$, $Na_2O$, $BaO$, $Tb_4O_7$, and $CaO$. The composition of the infiltrating glass-ceramic can vary, as long as its CTE is similar or preferably approximately the same as that of the Y-TZP in a temperature range between the glass-ceramic transition temperature ($T_g$) and room temperature and the final product has an aesthetic appearance. Silica based glass has a poor permeability in dense Y-TZP even at approximately 1450° C., which is similar to the sintering temperature of this material. In addition, post-sintering glass infiltration at this temperature may result in grain growth and/or destabilization of the tetragonal phase, which are known to be deleterious for hydrothermal stability of Y-TZP in the body (Chevalier, et al. (2004) *Biomaterials* 25: 5539-45; Chevalier (2006) *Biomaterials* 27: 534-43). Therefore, it is preferred to infiltrate the presintered Y-TZP and to combine infiltration and densification in one process. By doing so, the thickness of the graded glass-ceramic layer may be controlled by the porosity of presintered bodies. Further, combining infiltration and densification in one process can avoid grain growth and destabilizing of the tetragonal phase.

The G/C/G system of the present invention suppresses both occlusal surface contact damage and cementation internal surface flexural damage. The G/C/G system of the present invention substantially overcomes the warpage or bending problems associated with the G/C systems of the prior art. The unique structure of the present invention G/C/G, which provides an outer surface aesthetic residual glass layer, a graded glass-ceramic layer, and a dense interior ceramic provides the advantage that optical and the cementation properties may be optimized. FGMs with low modulus glass ceramics at both top and bottom surfaces, sandwiching a high modulus, strong ceramic interior, improve the resistance to both contact and flexural damage. Such graded structures together with the outer surface residual glass layers may be utilized to enhance the aesthetics and cementation behavior of polycrystalline dental ceramic cores.

In a copending provisional application, U.S. Provisional Patent Application Ser. No. 60/860,165, the disclosure of which is herein incorporated by reference, G/C/G structures are disclosed based upon a sandwiched layer of alumina. The present invention is based in part upon the unexpected discovery that FGMs having surprisingly superior properties are produced when the sandwiched layer comprises the exceptionally strong class of zirconia ceramics. It has been shown that continuously graded G/C composites, without significant internal stresses, may be produced by infiltrating glass into a dense ceramic surface where the two constituents G and C possess similar coefficients of thermal expansion (CTEs) and Poisson's ratio. Zirconia, more specifically yttria-tetragonal zirconia polycrystal (Y-TZP), is far superior to alumina in terms of mechanical properties, and the G/Z/G system used in the present invention provides robust, aesthetic, thin all-ceramic prostheses for less invasive posterior applications. However, the permeability of silica based glass in dense Y-TZP is poor even at temperatures near its sintering temperature. In addition, post-sintering glass infiltration at temperatures near the sintering temperature results in grain growth and/or destabilization of the tetragonal phase, which in turn deteriorates the hydrothermal stability of Y-TZP (Chevalier, et al. (2004) *Biomaterials* 25: 5539-45).

The present invention provides a G/Z/G FGM produced by infiltrating the surfaces of presintered Y-TZP with a powdered glass-ceramic slurry which has a similar CTE and Poisson's ratio to those of Y-TZP, and by combining infiltration and densification in one stage. By the term "presintered" is meant that the powdered composition of the substrate has been subjected to an elevated temperature/time heating schedule, but yet below that which would effect full densification of the compound. In this manner, complications arising from the post-sintering infiltration/heat-treatment can be avoided and the various graded layer thicknesses can be produced by controlling the porosity of presintered bodies using different presintering temperatures. Further, the aesthetics of FGMs is governed by the thickness of the surface residual glasses and the microstructure of graded layers. Therefore, an optimal thickness of the graded layer and surface residual glass layer that results in the best combination of aesthetics, resistance to contact damage and flexural fatigue is provided. The new G/Z/G composites offer better resistance to flexure-induced damage, better aesthetics, better veneering and cementation properties, and better resistance to hydrothermal degradation over the existing commercial Y-TZP cores.

Figure 6:
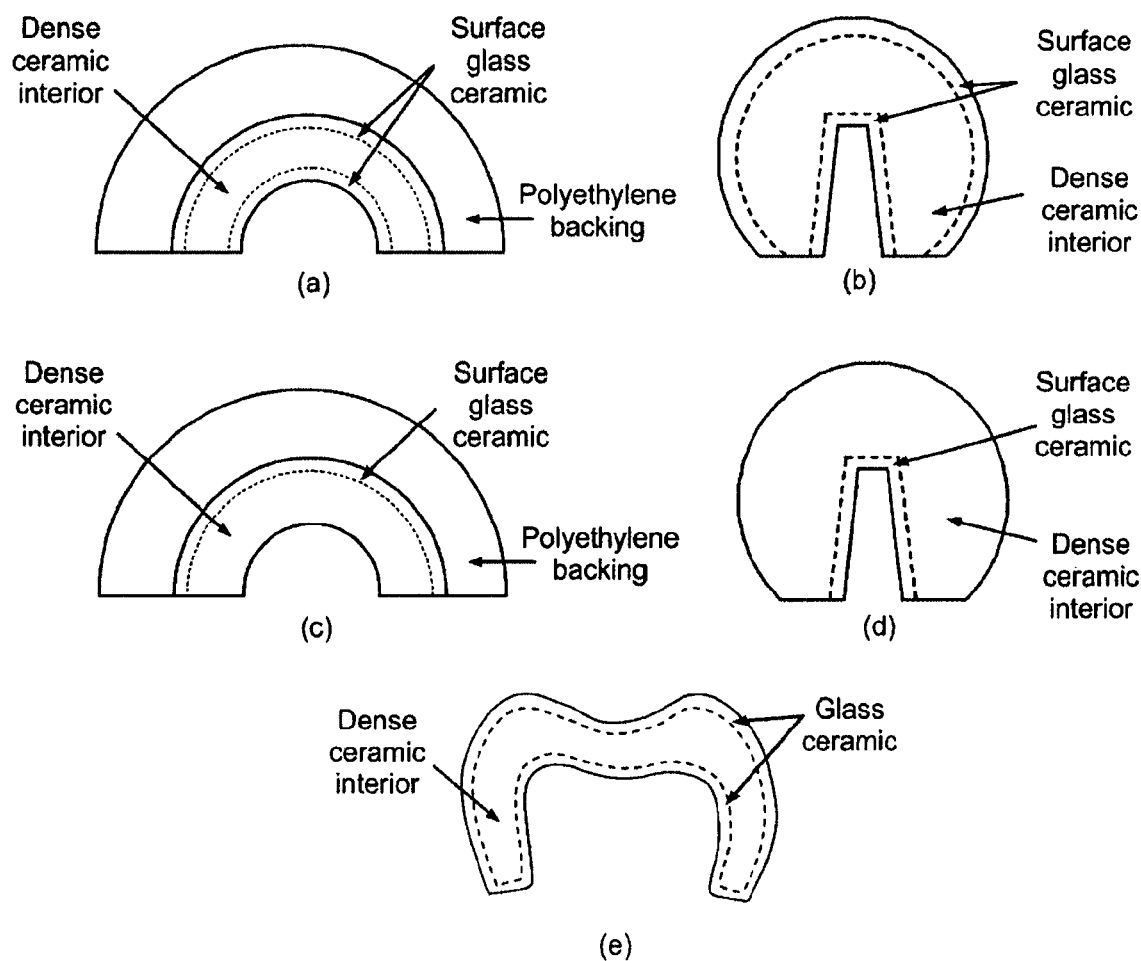
FIG. 6 is a schematic diagram illustrating a ceramic liner and a ceramic femoral head with (a) and (b) both surfaces graded or (c) and (d) only one surface graded for an orthopedic prosthesis. (e) Ceramic dental prosthesis (for both monolithic or core structures) with graded structures at surfaces subject to wear, contact, and impact.

The appearance of G/Z/G infiltrated on partially dense bodies presintered at 1400° C. is shown in FIG. 6, along with commercial monolithic glass ceramic Empress II (1.5 mm thick), veneered Lava zirconia (1 mm porcelain and 0.5 mm zirconia) and Cercon zirconia (1 mm porcelain and 0.5 mm zirconia). For better aesthetics, a thin veneer may be applied to the outer surface of G/Z/G. This thin veneer contains the contact damage, provides aesthetics, prevents unwanted wear of opposing natural dentition, and allows for adjustment on the occlusal surface. Any occlusal-surface contact damage will be confined within the thin veneer layer, because cracks are unlikely to propagate from a low modulus, low toughness porcelain to a high modulus, high toughness Y-TZP (Kim et al. (2006) *J Biomed Mater Res B Appl Biomater* 79(1): 58-65). The unique structure of G/Z/G, including a surface aesthetic residual glass layer, a graded glass-zirconia layer, and a dense interior Y-TZP layer allows for a thin veneer. The thickness of the surface aesthetic glass layer varies from 5 to 50 μm, depending on the fabrication conditions. Although the glass-zirconia graded layer has limited translucency due to its high crystalline content, it provides a gradual transition in translucency from the highly translucent porcelain veneer and surface residual glass layer to the opaque Y-TZP interior, which allows for the optical depth necessary in creating the right aesthetic outcome. Alternatively, color stains can be applied to the surface of the outer residual glass layer of G/Z/G using a powdered glass slurry that has similar composition to the infiltrated glass. This staining technique has been used on the Empress system to improve the aesthetic outcome of a single colored pressed block of glass-ceramic and is well established in aesthetic dentistry.

The present invention provides a uniform graded layer on both top and bottom surfaces of Y-TZP plates using glass infiltration technique. This technique can be readily used to fabricate graded structures on surfaces of orthopedic and dental prostheses with complex geometry (FIG. 6).

An objective of the invention is to develop robust, aesthetic, thin ceramic crowns and bridges for less invasive posterior restorative protocols. A G/Z/G material offers better resistance to flexure-induced damage, better aesthetics, and better veneering and cementation properties than bulk Y-TZP. A G/Z/G material eliminates sharp boundaries in veneered Y-TZP prostheses, which may lead to delamination of the porcelain veneer due to the dissimilar physical and mechanical properties of porcelain and Y-TZP. The residual glass and the glass containing graded layer on the internal side of G/Z/G offers robust adhesive bonding using, for example, etching-silane techniques rather than a traditional grit-blasting procedure. A traditional grit-blasting procedure may induce damage on the internal side of a dental restoration, resulting in strength degradation (Zhang et al. (2004) *Journal of Biomedical materials research* 71B(2): 381-6; Zhang, Y., B. R. Lawn, et al. (2006) *The International Journal of Prosthodontics* 19(5): 442-8). With an increase in resistance to flexural damage, the absence of grit-blasting damage, and the aid of adhesive cementation, the overall strength of the G/Z/G restoration is much higher than current veneered zirconia restorations. In addition, the current fixed partial dentures (FPDs) with Y-TZP framework often fracture from the lower portions of the connectors, leading to chipping or delamination of the porcelain veneer. A G/Z/G structure provides improved aesthetics, which allows for a FPD design without porcelain veneering in the lower portions of the connectors, improving the flexural damage resistance of PFDs. Finally, the residual glass at the G/Z/G surfaces acts as an encapsulation layer that may impede water absorption and prevent hydrothermal degradation of interior Y-TZP (Piascik et al. (2006) *J. Vac. Sci. Technol. A* 24(4) 1091-5). This can lead to the development of strong yet aesthetic ceramics for posterior inlays, onlays, crowns and bridges.

Fracture Mechanics Analysis

Damage in brittle ceramics loaded with a cylindrical or curved indenter was explored in detail in the late 1800s by Hertz who described characteristic fracture patterns called Hertzian or classical cone cracks (Hertz (1882) *J. Reine und Angewandte Mathematik* 92:156-171; Hertz (1896) *Hertz's Miscellaneous Papers*. London, Chs. 5,6: Macmillan). Intense research concerning damage modes in brittle coatings on compliant substrates loaded on the top surface, emulating ceramic crowns on dentin, began in the late 1980s. Most of the tests were done under single-cycle loading with a hard sphere indenter. Several damage modes, summarized in FIG. 7 were identified and analyzed. They can be divided into two categories: top-surface (occlusal-surface) damages from near-contact stresses, and bottom-surface (cementation internal surface) damage from far-field flexural stresses.

Near-contact occlusal-surface fracture modes in brittle materials, including outer cone cracks and median cracks, formed by precursor quasiplastic deformation. Outer cone cracks (O, FIG. 7) initiate just outside the indenter contact area where the maximum tensile stress of Hertizan stress field occurs. Quasiplastic deformation forms beneath the indenter, producing grain boundary microcracks which coalesce and evolve into occlusal-surface median cracks (M, FIG. 7). For brittle dental ceramics like porcelain and alumina, classical cone cracks dominate.

Far-field cementation internal surface radial fractures (R, FIG. 7) result from tensile stresses generated during loading. Radial cracks are oriented normal to the plate surface and are susceptible to any flexural tensile stresses generated during function. Therefore, once initiated, they propagate sideward and upward, ultimately leading to fracture (Kelly (1999) *The Journal of Prosthetic Dentistry* 81(6): 652-61). In dental crowns, radial cracks are clinically evidenced as bulk fracture which is believed to constitute the primary mode of failure of all-ceramic crowns. The load to initiate these internal surface radial cracks ($P_r$) depends strongly on thickness and elastic modulus of the ceramic and substrate and is given by $P_r = B\sigma_c d^2/(\log E_c/E_s)$, where B is a constant, $\sigma_c$ is the flexural strength of the material, d is the ceramic layer thickness, $E_c$ is the elastic modulus of the ceramic, and $E_s$ is the elastic modulus of the supporting substrate.

Extensive testing of porcelains, aluminas, zirconias, and glass ceramics on compliant structures have provided the data that has ultimately lead to fundamental relationships concerning loads to damage initiation for outer, median, and radial cracks for this broad array of ceramic layers on compliant structure for clinically relevant thickness under single-cycle loading. While there is competition for all outer, median, and radial modes to develop, in general radial cracks are likely to initiate first in thin sections (<0.8-1.0 mm), outer and median to develop first in thicker sections. The next goal is to develop a material with improved resistance to all these damage modes and wear while not increasing the hardness, elastic modulus, and fracture toughness of the surface of the prostheses, to avoid excessive wear of the opposing tooth or crown.

Damage Resistance of FGMs

The theoretical framework concerning frictionless normal indentation of elastically graded materials from a point load or from different indenter geometries has been developed by Giannakopoulos and Suresh. Explicit analytical expressions have been developed to relate the indentation load P to the penetration depth h, the contact radius a, and contact pressure $p_0$, for a Young's modulus E which varies with depth z beneath the indented surface. Theory predicts that when the elastic modulus increases with depth, the stress fields for the power-law case are focused more in the interior than for the corresponding exponential case. Experimental studies showed when glasses infiltrate into a dense ceramic surface, the Young's modulus variation from surface to interior is best described by the power-law relation $E=E_0 z^k$, where $E_0$ is the reference Young's modulus at the surface and k is a dimensionless constant (Jitcharoen et al. (1998) *Journal of the American Ceramic Society* 81(9): 2301-8). Such elastic variation effectively transfers the maximum contact stresses into interior upon occlusion, resulting in much improved resistance to quasiplastic deformation and brittle fracture at or in the vicinity of the occlusal surface.

Figure 7A:
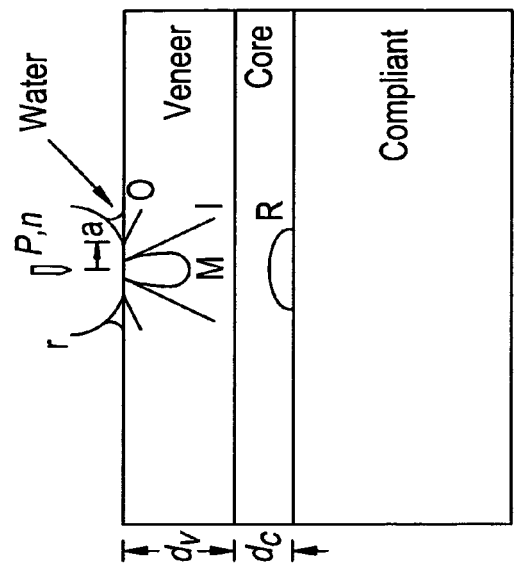
FIG. 7 is a schematic illustration of crack geometry for cyclic loading of (a) monolith ceramic coatings and (b) veneered ceramic layers on compliant substrates with sphere of radius r at load P in water. Near-contact surface damage modes: outer cone (o); inner cone (I); median crack (M). Far-field internal surface radial crack (R).
Figure 7B:
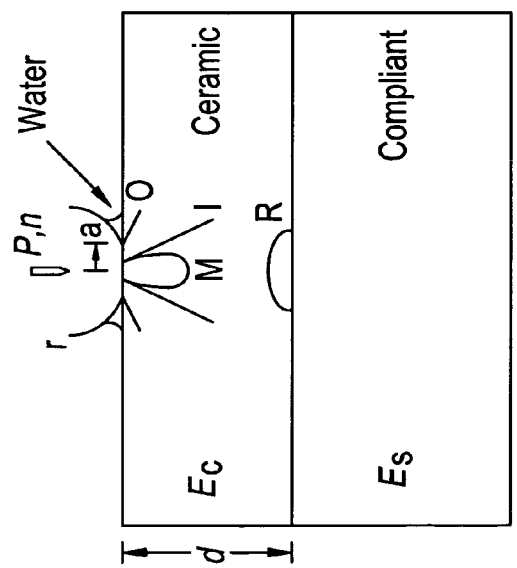

When a ceramic plate mounted onto a less stiff substrate (tooth-dentin) is subjected to loading from the top surface with a sphere indenter, the bottom surface of the ceramic plate experiences a maximum tensile stress which can result in bottom surface R cracking (FIG. 7). Finite Element Analysis (FEA) of FGMs with an increasing elastic modulus from the bottom surface to interior shows that the maximum tensile stress could be lowered by 20% compared to its bulk ceramic counterpart, even if the graded layer at the ceramic bottom surface is only 200 µm thick (Huang et al. (2007) *J Mater Sci Mater Med* 18(1):57-64). This is because the FGM at the bottom surface spreads the maximum tensile stresses from the surface into the interior. Therefore, if both top and bottom ceramic surfaces are graded, the damage modes shown in FIG. 7 can all be suppressed.

Ceramic crowns are vulnerable to near-contact and far-field flexure induced fracture from concentrated loading.

Their vulnerability is exacerbated by damage, fatigue loading, and moisture. Although there has been immense amount of study concerning the fracture of ceramic crowns, the bulk of the work reported in the literature has focused on simple flexural strength tests under monotonic loading (Guazzato et al. (2004) *Dental Materials* 20: 449-456; Guazzato et al. (2004) *Biomaterials* 25: 5045-5052) or residual strength measurement following cyclic fatigue using load-to-fracture crushing test (Jung et al. (2000) *Journal of Dental Research* 79(2): 722-31; Stappert et al. (2005) *Journal of Prosthetic Dentistry* 94(2): 132-139). These tests may not accurately predict the lifetime of real ceramic crowns, because most dental ceramics are susceptible to moisture assisted slow crack growth, which can result in a reduction in strength by 50% or more over a year or so (Zhang et al. (2004) *Journal of Biomedical Materials Research* 69B: 166-72). Also, ceramics are susceptible to cumulative mechanical damage during contact loading. It is important to systematically analyze fracture modes and damage evolution in ceramic layers in clinically-relevant testing-namely cyclic loading beneath a spherical indenter in a wet environment. A new damage mode, inner cone fracture, has been identified (FIG. 7). It is now well-appreciated that crack initiation and evolution is complex. Competing failure modes may develop on different surfaces, at different stages, and may interact depending on ceramic properties, layer thicknesses, and loading conditions (Zhang et al. (2005) *Journal of Materials Research* 20(8): 2021-9).

Glass/Zirconia/Glass Structure

A G/Z/G structure offers better resistance to flexure induced damage (FIG. 4), better aesthetics, and better veneering and cementation properties over bulk Y-TZP. G/Z/G eliminates sharp interfaces in veneered Y-TZP prostheses, which may ordinarily lead to delamination of the porcelain veneer due to the dissimilar physical and mechanical properties of porcelain and Y-TZP (Sundh et al. (2004) *Journal of Oral Rehabilitation* 31(7): 682-8; Vult von Steyern et al. (2006) *Journal of Oral Rehabilitation* 33(9): 682-9; Wood et al. (2006) *J. Prosthet. Dent.* 95(1): 33-41). The residual glass and the glass containing graded layer on the internal side of G/Z/G offer great potential for adhesive bonding using etching-silane techniques rather than the current grit-blasting procedure, which induces damage on the internal side of a dental restoration, resulting in strength degradation (Zhang et al. (2004) *Journal of Biomedical Materials Research* 69B: 166-72). With an increase in resistance to flexural damage, the absence of grit-blasting damage, and the aid of adhesive cementation, the overall strength of the G/Z/G restoration is much higher than current veneered zirconia restorations. In addition, the current fixed partial dentures (FPDs) with Y-TZP framework often fracture from the lower portions of the connectors, leading to chipping or delamination of the porcelain veneer. G/Z/G has improved aesthetics, which allows for a FPD design without porcelain veneering in the lower portions of the connectors, improving the flexural damage resistance of PFDs. Finally, the residual glass at the G/Z/G surfaces acts as an encapsulation layer that may impede water absorption and prevent hydrothermal degradation of interior Y-TZP (Piascik et al. (2006) *J. Vac. Sci. Technol. A* 24(4) 1091-5). This allows strong yet aesthetic ceramics for posterior inlays, onlays, crowns, and bridges.

The invention is further illustrated by the following Examples which are intended to be illustrative of the invention. Those of skill in the art may vary many experimental parameters within the scope of the appended claims.

EXAMPLE 1

Green compacts were formed from a yttria-stabilized zirconia powder, 5.18 wt % $Y_2O_3$, 0.25 wt % $Al_2O_3$, and a mean particle size of diameter approximately 28 nm with a specific surface area of 16 $m^2/g$ (TZ-3Y-E grade, Tosoh, Tokyo, Japan) using a cold isostatic press at 172 MPa (25 kpsi). The green compacts were presintered at temperatures between 1100 and 1400° C. for 1 hour in air. Infiltration and densification were carried out at 1450° C. for 2 hours using a custom developed glass-ceramic powder of the type described above. A heating and cooling rate of 800° C./hour was employed. Two glass-ceramic compositions were prepared for infiltration of Y-TZP. The glass-ceramic powder composition 1 consisted of the following main oxides (i.e. at 1.0 weight percent or more): $SiO_2$ (67.25 wt %), $Al_2O_3$ (10.83 wt %), $K_2O$ (9.22 wt %), $Na_2O$ (6.61 wt %), CaO (2.68 wy %), $Tb_4O_7$ (1.84 wt %), BaO (1.02 wt %), and a small amount of MgO. The glass-ceramic powder composition 2 consisted of $SiO_2$ (67.42 wt %), $Al_2O_3$ (11.42 wt %), $K_2O$ (9.12 wt %), $Na_2O$ (6.29 wt %), CaO (2.74 wt %), $Tb_4O_7$ (1.51 wt %), BaO (1.19 wt %) and a small amount of $Ce_2O_3$.

Figure 2:
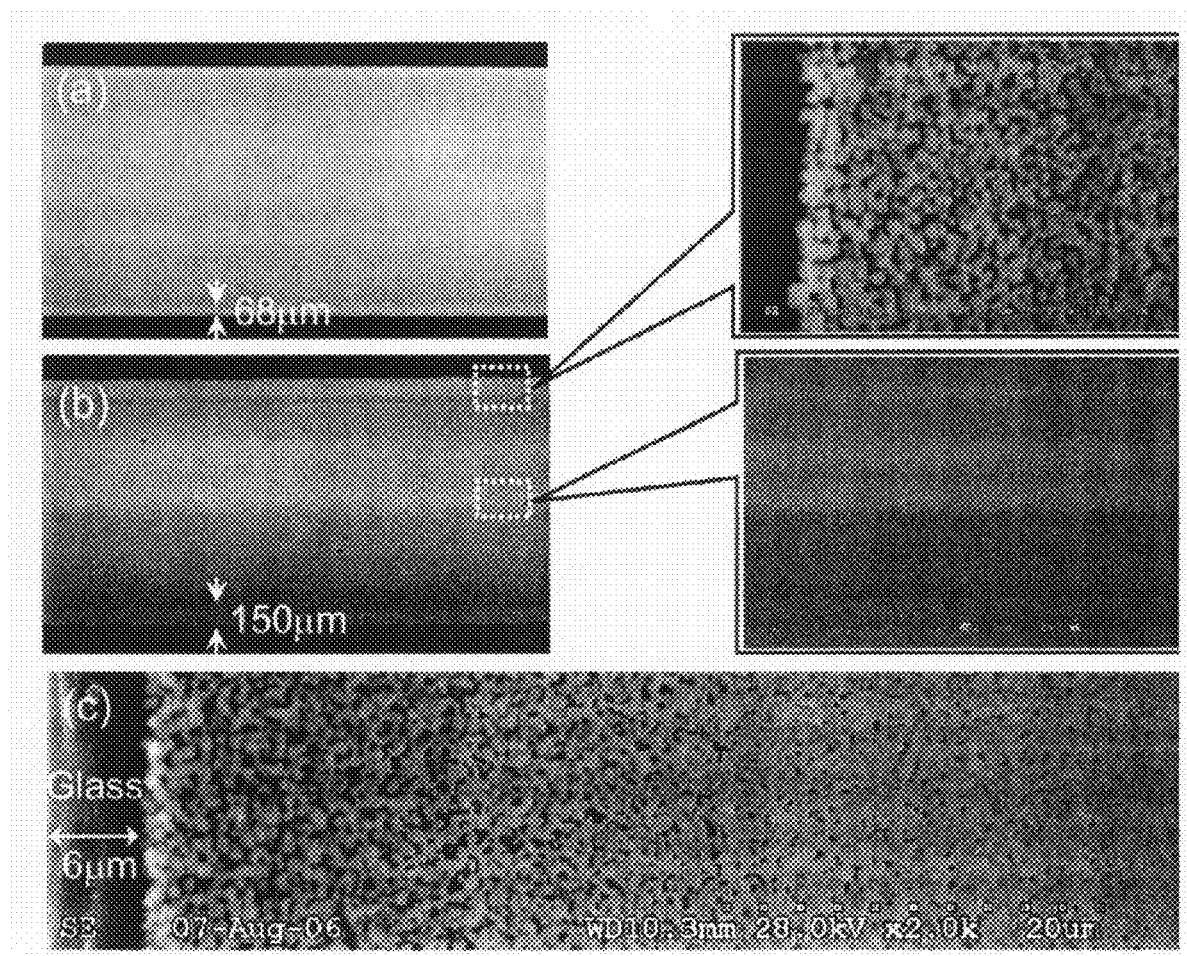
FIG. 2 provides optical microscope images showing cross-sectional views of polished G/Z/G FGMs (d=1.5 mm) fabricated from Y-TZP plates presintered at (a) 1400° C. for 1 hour and (b) 1100° C. for 1 hour. Glass infiltration and densification were carried out at 1450° C. for 2 hours in air. Different thicknesses of surface graded glass-ceramic layers in the two cases. Inserts in FIG. 2b are SEM images showing surface graded layer containing high glass content whereas the interior consists of dense Y-TZP. (c) A low magnification SEM image of G/Z/G fabricated from 1100° C. for 1 hour presintered specimen revealing (from left to right): an outer surface residual glass layer (approximately 6 μm thick) and a graded glass-zirconia layer. The glass content (black) gradually decreases as proceeding towards the interior.

Optical microscope images of G/Z/G fabricated from presintered bodies using glass-ceramic composition 1 are shown in FIG. 2. Graded layers at both surfaces of G/Z/G plates are approximately 60 and 150 μm thick for 1400 and 1100° C. presintered specimens respectively (FIGS. 2a and b). Higher magnification SEM (inserts of FIG. 2b) revealed that the graded layer consists of a high glass content (approximately 40 vol. %) whereas the interior comprises dense Y-TZP. A thin aesthetic residual glass layer is observed on the surfaces of G/Z/G FGMs (FIG. 2c); typically being <10 μm for 1100° C. presintered and <30 μm for 1400° C. presintered specimens respectively.

EXAMPLE 2

A standard three-point bending test with a span of 20 mm was used to fracture rectangular bar specimens at a crosshead speed of 1 mm/min on a computer-controlled universal testing machine (model 5566, Instron Corp., Canton. Mass.). Flexural strength, σ, was determined using the equation below for homogeneous zirconia and for the two G/Z/G compositions fabricated from infiltrating 1400° C. for 1 hour presintered Y-TZP with in-house prepared glass-ceramic powders (composition 1 or 2) at 1450° C. for 2 hours:

$$\sigma = 3Pl/2wb^2$$

where P is the breaking load; l is the test span; and w and b are the specimen width and thickness, respectively. Flexural strengths of the two G/Z/G compositions and the homogeneous zirconia control are reported in Table 1. Data are presented in the form of mean and standard deviation (mean±SD) for a specimen size n=6. As can be seen, flexural strengths for G/Z/G infiltrated with glass-ceramic composition 1 and 2 were approximately 43% and 47%, respectively, higher than those for homogenous Y-TZP specimens. 1-sample t-test showed that it was highly unlikely (p<0.001) that a sample as strong as G/Z/G could have been sampled from the population of homogeneous Y-TZP.

TABLE 1

Flexural strength data of the two G/Z/G compositions fabricated from infiltrating 1400° C. for 1 hr presintered Y-TZP with in-house prepared glass-ceramic powders (composition 1 or 2) at 1450° C. for 2 hr and their homogeneous Y-TZP counterpart.

| Specimens | Flexural strength, σ, MPa (mean ± SD) |
|---|---|
| G/Z/G (infiltrated with glass-ceramic composition 1) | 1443.8 ± 252.2 |
| G/Z/G (infiltrated with glass-ceramic composition 2) | 1485.8 ± 186.5 |
| Homogeneous Y-TZP | 1012.7 ± 158.5 |

EXAMPLE 3

Figure 4:
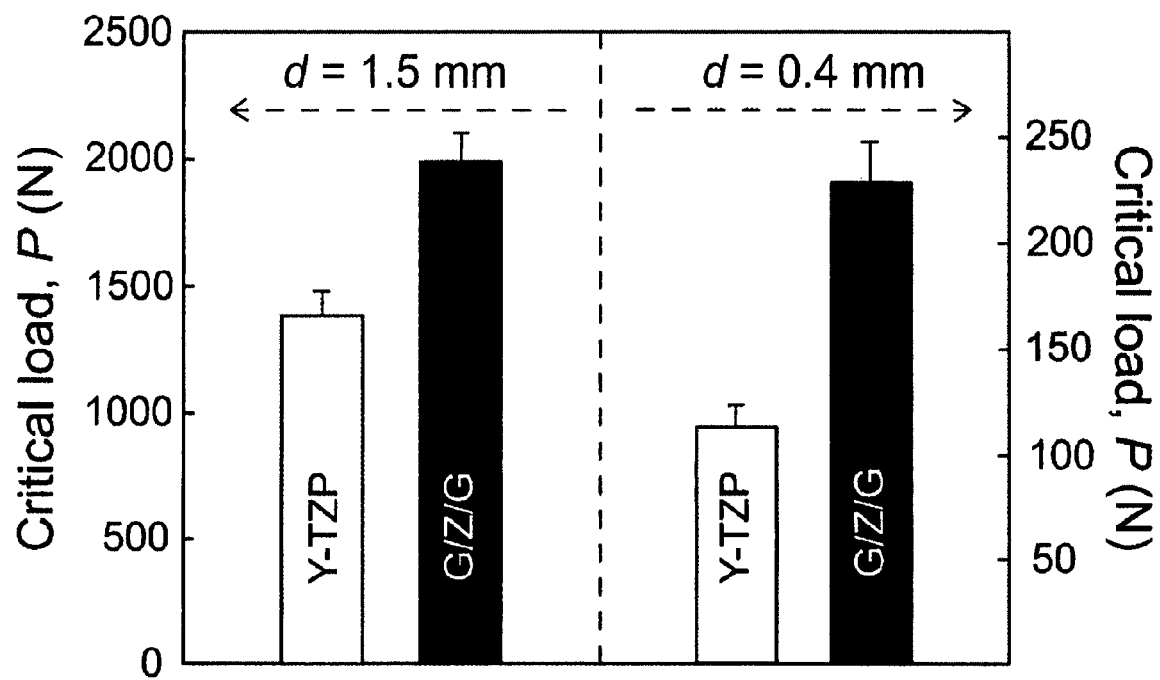
FIG. 4 is a bar chart depicting critical loads for internal surface radial cracking of ceramic plates (d=1.5 or 0.4 mm) on polycarbonate substrates. Ceramic plates are G/Z/G fabricated from glass infiltration of 1400° C. presintered Y-TZP and the bulk Y-TZP. Note the advantage of G/Z/G over Y-TZP is more pronounced for thinner samples.

Ceramic plates were epoxy bonded to polycarbonate bases and loaded on the top surface, emulating ceramic dental crowns on tooth dentin support subjected to occlusion or ceramic liner on polyethylene backing subjected articulation in total hip replacement. Critical loads for the onset of ceramic bottom surface radial cracking (an indication of flexural strength of the ceramic plates) were measured for homogeneous zirconia and for G/Z/G (d=1.5 or 0.4 mm) fabricated from infiltrating 1400° C. for 1 hour presintered T-YZP with an in-house prepared glass-ceramic powder (composition 1) at 1450° C. for 2 hours. Six specimens (n=6) were fabricated from two different batches for each G/Z/G thickness: 20×20×1.5 mm$^3$ or 20×20×0.4 mm$^3$. Variations in critical loads between specimens fabricated from the two different batches were similar to those prepared from the same batch, being typically approximately 10%. As shown in FIG. 4, critical loads for G/Z/G infiltrated at 1400° C. for 1 hour presintered Y-TZP were approximately 30% higher than those for homogenous Y-TZP for 1.5 mm specimens, while critical loads for G/Z/G fabricated at the same condition was almost twice that of those for bulk Y-TZP when the specimen thickness was reduced to 0.4 mm. Again, 1-sample t-test showed a significant omnibus test results (i.e. p<0.001) for both thicknesses.

Figure 3:
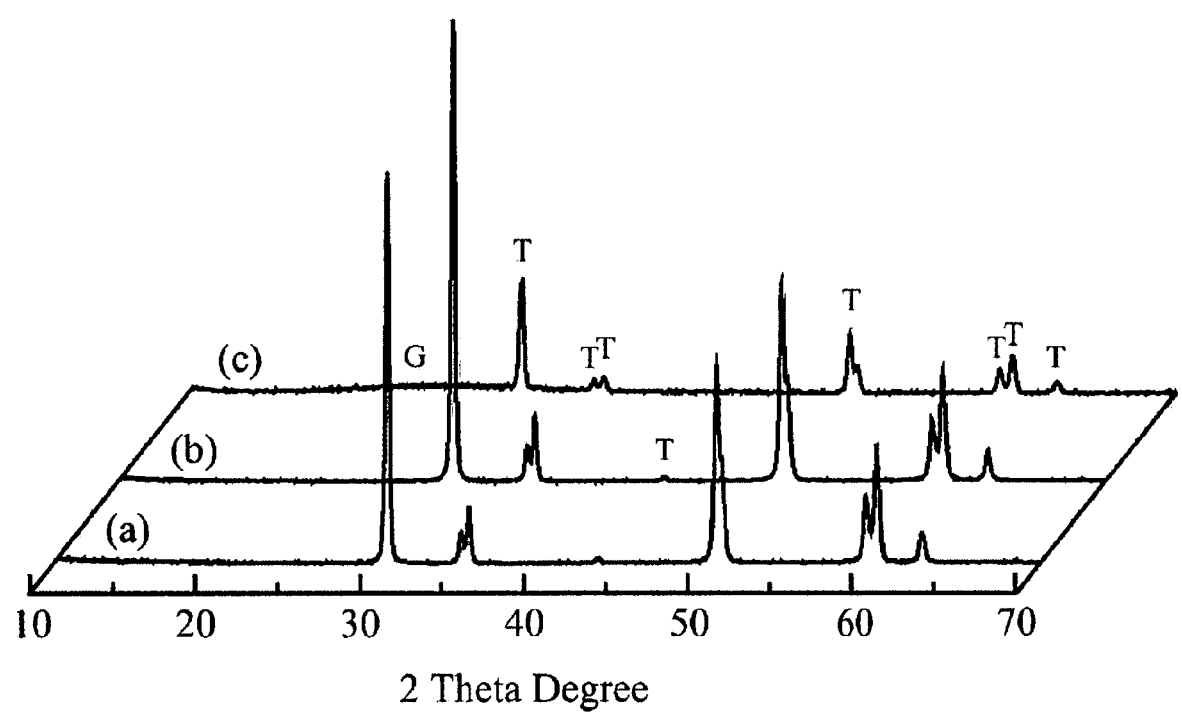
FIG. 3 shows XRD spectra of (a) homogenous Y-TZP sintered at 1450° C. for 2 hours; (b) Y-TZP presintered at 1100° C. for 1 hour; and (c) G/Z/G frabricated from infiltration and densification of presintered (1100° C. for 1 hour) at 1450° C. for 2 hours. T: tetragonal zirconia phase, and G: amorphous glass phase. No secondary crystalline phase exists in G/Z/G FGMs. Spectra acquired using CuKα radiation with a scan rate of 1°/min and a step size of 0.2°.

FIG. 3 provides XRD spectra of (a) homogenous Y-TZP sintered at 1450° C. for 2 hours; (b) Y-TZP presintered at 1100° C. for 1 hour; and (c) G/Z/G frabricated from infiltration and densification of presintered (1100° C. for 1 hour) at 1450° C. for 2 hour. T: tetragonal zirconia phase, and G: amorphous glass phase. Note that no secondary crystalline phase exists in G/Z/G FGMs. Spectra were acquired using CuKα radiation with a scan rate of 1°/min and a step size of 0.2°.

EXAMPLE 4

Using a glass-ceramic powder, initial infiltration conditions to fabricate G/Z/G structures in the thickness necessary for dental applications were determined. Preliminary data show that silica based glass has a limited permeability in dense Y-TZP even at approximately 1450° C., which is similar to the sintering temperature of this material. In addition, post-sintering glass infiltration at this temperature could result in grain growth and/or destabilizing of the tetragonal phase, which are known to be deleterious for hydrothermal stability of Y-TZP in the body (Chevalier (2006) *Biomaterials* 27: 534-43; Chevalier et al. (1999) *Journal of the American Ceramic Society* 82(8): 2150-4). Therefore, it is preferred to infiltrate the presintered Y-TZP and to combine infiltration and densification in one process. Thereby, the thickness of the graded glass-zirconia layer can be controlled by the porosity of presintered bodies, and combining infiltration and densification in one process can avoid grain growth and destabilizing of the tetragonal phase.

Green compacts were formed from a yttria-stabilized zirconia powder, 5.18 wt % $Y_2O_3$, 0.25 wt % $Al_2O_3$, and a mean particle size of diameter approximately 28 nm with a specific surface area of 16 m$^2$/g (TZ-3Y-E grade, Tosoh, Tokyo, Japan) using a cold isostatic press at 172 MPa. The green compacts were presintered at 1100 or 1400° C. for 1 hr in air. Infiltration and densification were carried out at 1450° C. for 2 hours using a custom developed glass-ceramic powder (FIG. 1).

FIG. 1 is a schematic diagram illustrating the processing method for the fabrication of flat G/Z/G composite: applying a powdered glass-ceramic slurry at the top and bottom surfaces of presintered Y-TZP (left), and sintering at 1450° C. for 2 hours to form a G/Z/G composite. The G/Z/G structure consists of an outer surface aesthetic residual glass layer, a graded glass-zirconia layer, and a dense interior Y-TZP.

Optical microscope images of G/Z/G fabricated from presintered bodies are shown in FIG. 2. Graded layers at both surfaces of G/Z/G plates are approximately 60 and 150 μm thick for 1400 and 1100° C. presintered specimens, respectively (FIGS. 2a and 2b). Higher magnification SEM (inserts of FIG. 2b) reveals that the graded layer consists of a high glass content (approximately 40 vol. %) whereas the interior comprises dense Y-TZP. A thin aesthetic residual glass layer is observed on the surfaces of G/Z/G FGMs (FIG. 2c) It is typically less than 10 μm for 1100° C. presintered and less than 50 μm for 1400° C. presintered specimens respectively.

One concern for G/Z/G FGMs is that the crystallization of glass, both in surface residual glass layer and in the graded layer, upon cooling, could modify the CTE and impair the aesthetics of G/Z/G. For this reason, a glass composition which exhibits excellent resistance to crystallization upon cooling was formulated. X-ray diffraction (XRD) analysis of G/Z/G FGMs revealed a small amount of glass phase in the surface residual glass and graded glass-ceramic layers and there is no detectable secondary crystalline phase present in addition to the metastable tetragonal phase, at least within the detection limit of XRD (i.e. approximately 3 vol. %) (FIG. 3c). XRD spectrum of a sintered Y-TZP (1450° C. for 2 h) is shown in FIG. 3a. In addition, no monoclinic phase is observed in either presintered (FIG. 3b) or infiltrated Y-TZP specimens (FIG. 3c).

Critical loads were measured for polished bulk Y-TZP and G/Z/G plates (d=1.5 or 0.4 mm) fabricated from infiltrating presintered Y-TZP (1400° C. for 1 hour) with an in-house prepared glass-ceramic powder (composition 1) at 1450° C. for 2 hours. Six specimens (n=6) were fabricated from two different batches for each thickness (d=1.5 or 0.4 mm). A ~10% variation in critical load was observed between the specimens fabricated from the two different batches. As shown in FIG. 4, for 1.5 mm thick specimens, critical loads (mean±SD) for G/Z/G are ~30% higher than those for bulk Y-TZP. However, for 0.4 mm thick specimens, critical loads for G/Z/G are almost twice as high as those for bulk Y-TZP, suggesting that the impact of graded structure on the flexural damage resistance could be more significant for thin (d<0.5 mm) ceramic prostheses. Again, 1-sample t-test shows a significant omnibus test results (i.e. p<0.001) for both thickness.

Figure 5:
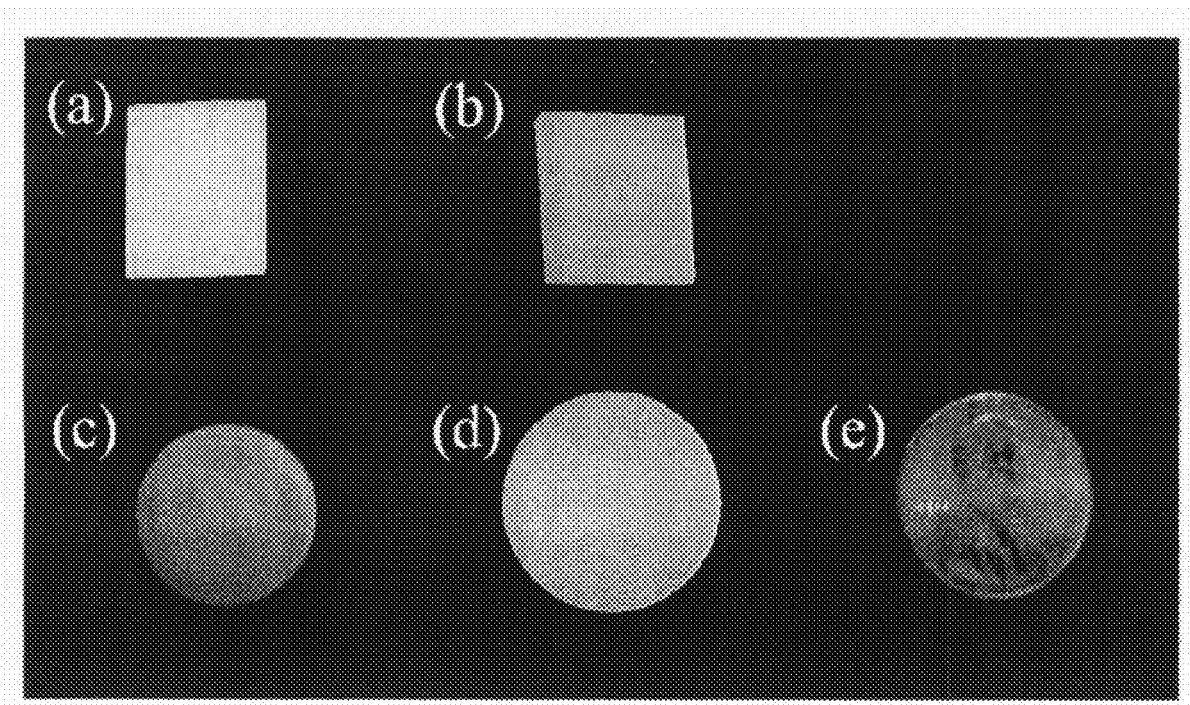
FIG. 5 is a digital photograph depicting (a) a G/Z/G plate (1.5 mm thick) fabricated from glass infiltration of 1400° C. presintered Y-TZP using a glass-ceramic composition 1. For comparison, a monolithic glass ceramic (b) Empress II, porcelain veneered zirconias (c) Lava and (d) Cercon of 1.5 mm thickness are also shown. Also, a one cent coin is shown (e) for size reference.

The appearance of G/Z/G infiltrated on partially dense bodies presintered at 1400° C. is shown in FIG. 5, along with commercial monolithic glass ceramic Empress II (1.5 mm thick), veneered Lava zirconia (1 mm porcelain and 0.5 mm zirconia) and Cercon zirconia (1 mm porcelain and 0.5 mm zirconia). For better aesthetics, we propose to apply a thin porcelain veneer (approximately 0.3 mm thick) to the outer surface of G/Z/G. This thin veneer could contain the contact damage, provide aesthetics, prevent unwanted wear of opposing natural dentition, and allow for adjustment on the occlusal surface. Any occlusal-surface contact damage will be confined within the thin veneer layer, because cracks are unlikely to propagate from a low modulus, low toughness porcelain to a high modulus, high toughness Y-TZP (Kim et al. (2006). *J Biomed Mater Res B Appl Biomater* 79(1): 58-65), and the contact damage containment predictions will be examined. The thin veneer concept is supported by the unique structure of G/Z/G, which includes a surface aesthetic residual glass layer, a graded glass-zirconia layer, and an interior Y-TZP layer (FIG. 2). Although the glass-zirconia graded layer has limited translucency due to its high crystalline content, it provides a gradual transition in translucency from the highly translucent porcelain veneer and surface residual glass layer to the opaque Y-TZP interior, which allows for the optical depth necessary in creating a good aesthetic outcome. Alternatively, color stains can be applied to the surface of the outer residual glass layer of G/Z/G using a powdered glass-ceramic slurry that has similar composition to the infiltrated glass. This staining technique has been used on the Empress system to improve the aesthetic outcome of a single colored pressed block of glass-ceramic and is well established in aesthetic dentistry.

EXAMPLE 5

Bilayer specimen fabrication. Table 2 summarizes the materials used. Bilayer specimens of G/Z/G layers on polycarbonate substrates are fabricated. The G/Z/G is based on infiltrating an in-house developed glass-ceramic into the surfaces of presintered Y-TZP (fabricated from a fine-grain Y-TZP powder, TZ-3Y-E, Tosoh, Tokyo, Japan) at the sintering temperature 1450° C. for 2 hours in air, combining infiltration and densification in one process. A structure-damage resistance relation is established under cyclic loading for this system. Polycarbonate is selected as a support material for the FGMs because it is compliant and can be considered to represent dentin or bone (though its elastic modulus is slightly lower than that of either) and is transparent, permitting direct observation of fractures evolving from or propagating to the bottom surface of the G/Z/G layer. Specimens are loaded using a 3.18 mm radius glass or WC sphere.

TABLE 2

Material properties and sources.

| Material | Young's modulus (GPa) | Thermal expansion coefficient (° C.$^{-1}$) | Poisson's ratio | Brand Name and Source |
|---|---|---|---|---|
| Glass-ceramic | 70 | 10.3 × 10$^{-6}$ | 0.26 | In-house composition |
| Y-TZP | 210 | 10.4 × 10$^{-6}$ | 0.30 | TZ-3Y-E, Tosoh |
| Epoxy resin | 3.4 | — | 0.33 | Harcos Chemical |
| Resin cement | 3.1 | | | Rely x ARC, 3M |
| Polycarbonate | 2.3 | — | 0.33 | Hyzod, AIN Plastics |
| Composite | 18 | | | Z100, 3M |
| WC | 614 | — | 0.30 | r = 3.18 mm, J & L Industrial Supply |

Flat Y-TZP green compacts, fabricated from a fine-grain yttria-stabilized zirconia powder (TZ-3Y-E, Tosoh), are presintered at temperatures between 900 and 1400° C., creating zirconia plates with various porosities. The top and bottom surfaces of presintered Y-TZP are coated with a powdered glass-ceramic slurry which has a similar CTE and Poisson's ratio to those of Y-TZP (Table 2). Glass infiltration and densification is carried out simultaneously at 1450° C. for 2 hours inside a high temperature box air furnace (ST-1700C-6612, Sentro Tech Corp, Berea, Ohio). A heating and cooling rate of 800° C./hour is employed. This minimizes grain growth and/or destabilizing of the tetragonal phase associated with the post-sintering heat treatment. Both grain growth and destabilizing of the tetragonal phase are deleterious for long-term hydrothermal stability of Y-TZP in biomedical applications. G/Z/G specimens with two final dimensions are fabricated: 20×20×1.2 mm$^3$ or 20×20×0.4 mm$^3$. In addition, by manipulating the porosity of the presintered Y-TZP body, the glass penetration depth may be controlled, creating G/Z/G structures with various thicknesses of the graded glass-zirconia layers (FIG. 2). Three groups of specimens with different graded glass-zirconia layer thicknesses are fabricated for a G/Z/G of 0.4 mm total thickness, and six groups with different graded layer thicknesses for a G/Z/G of 1.2 mm total thickness (Table 3). An equal thickness of the graded layer at the top and bottom surfaces for each specimen is maintained to prevent warpage. The effect of graded layer thickness on damage resistance for G/Z/G with different thicknesses may be elaborated by comparing specimen groups G-Tn1, G-Tn2, G-Tn3 with G-Tk1, G-Tk2, G-Tk3. The effect of relative ratio of the graded layer and the total specimen thickness on the damage resistance may be examined by comparing specimen groups G-Tn1, G-Tn2, G-Tn3 with G-Tk3, G-Tk4, G-Tk5. Tn and Tk represent thin (0.4 mm) and thick (1.2 mm) specimens respectively.

TABLE 3

Design parameters for G/Z/G with various thicknesses of graded layers at top and bottom surfaces. Tn and Tk represent thin (0.4 mm) and thick (1.2 mm) specimens respectively.

| | Total G/Z/G thickness (mm) | | | | | | | | |
|---|---|---|---|---|---|---|---|---|---|
| | 0.4 | | | 1.2 | | | | | |
| | Graded layer thickness (mm) | | | | | | | | |
| | G-Tn1 | G-Tn2 | G-Tn3 | G-Tk1 | G-Tk2 | G-Tk3 | G-Tk4 | G-Tk5 | G-Tk6 |
| Top surface | 0.05 | 0.10 | 0.15 | 0.05 | 0.10 | 0.15 | 0.30 | 0.45 | 0.55 |
| Bottom surface | 0.05 | 0.10 | 0.15 | 0.05 | 0.10 | 0.15 | 0.30 | 0.45 | 0.55 |

The excess glass may be ground away from the G/Z/G surfaces and the plates will be epoxy bonded (Harcos Chemicals, Bellesville, N.J.) to a 12.5 mm thick polycarbonate substrate (Hyzod, AIN Plastics, Norfolk, Va.) for single-cycle-load screen test using a spherical tungsten carbide indenter (r=3.18 mm) to determine the flexure induced damage resistance of the G/Z/G cores. Only the two strongest groups (requiring higher loads to fracture) from the single-cycle-load screen results for each specimen thickness 1.2 or 0.4 mm is chosen for cyclic fatigue tests to construct the design maps. Specimens with polished internal surfaces but with residual aesthetic glass on the occlusal surface are epoxy bonded to polycarbonate substrates for fatigue tests using a spherical glass indenter (r=3.18 mm) in water. The stronger group out of the two groups subjected to cyclic fatigue test is selected to determine the effect of surface treatment on the damage resistance of G/Z/G. Specimens of 1.2 mm thick with abraded or etched internal surfaces are epoxy bonded to polycarbonate substrates for fatigue tests using a glass indenter in water. As-polished surfaces yield the intrinsic strength of FGMs but may not represent real-life conditions. Laboratory and clinical practices (e.g., particle abrasion or etching of the internal surface of all-ceramic crowns and bridges) may damage the surface. To mimic this, the ceramic bottom surface is abraded with 50 μm alumina particles for 5 seconds from a standoff distance of 10 mm using 276 KPa compressed air pressure or etched with HF solution (9.5%) for 90 seconds. Finally, the stronger group out of the two groups subjected to cyclic fatigue tests is cemented (Rely X ARC, 3M/ESPE, St. Paul, Minn.) to a 5 mm thick Z100 substrate (3M/ESPE, St. Paul, Minn.) for step-stress fatigue tests using a glass indenter in water. The internal surface of G/Z/G is abraded or etched, based on the treatment that will yield a better damage resistance from the preceding tests. To simulate the aesthetic veneer, a thin porcelain veneer may be placed on the occlusal surface of the G/Z/G structure (1.2 mm G/Z/G and 0.3 mm porcelain). Since extensive data on flat bilayer specimens have been generated, some additional flat specimens, namely Lava zirconia plate on polycarbonate and porcelain veneered Lava zirconia on Z100 substrate, are fabricated as controls to assure validity of comparisons with previous data.

EXAMPLE 6

GZG Test configuration. Cracks are initiated and propagated by loading the bilayer specimens (a G/Z/G layer of 1.2 mm or 0.4 mm thick on polycarbonate substrate) with a 3.18 mm radius sphere (tungsten carbide or glass). Initiation and evolution of the near-contact occlusal surface damages, namely outer cone, inner cone and median cracks, are characterized using a confocal optical microscopy (K2S-BIO, Technical Instruments, Burlingame, Calif.), viewing from the contact surface (occlusal surface) and progressively focusing down to the interior of the specimen. A cyclic loading fatigue test is performed on a mouth-motion simulator (Elf 3300, EnduraTEC, Minnetonka, Minn.) using a controlled loading profile to simulate the normal chewing function: maximum load (biting force), loading and unloading rates 1000 N/sec, and chewing frequency 1 Hz. Conventional cyclic fatigue profile (fatigue to failure with a prescribed maximum load) and step-stress fatigue testing (fatigue to failure with consecutively increasing loads) is employed to construct the design maps and to predict the performance, respectively. Fatigue testing is interrupted after each cyclic loading step and damage sustained in the G/Z/G layer is examined by confocal microscopy. Tests may be continued until failure of the G/Z/G layer. Failure is defined when one of the near-contact surface crack systems propagates through the entire G/Z/G layer or the cementation radial fracture is observed. Occasionally, specimens may be randomly selected and sectioned for cross-sectional examination using the optical microscopy and SEM to confirm the confocal microscopy observation.

Using transparent polycarbonate as a substrate, initiation of the far-field radial cracks at the bottom surface of the G/Z/G layer may be imaged directly from below. This provides insight into relative order of fracture initiation for competing fracture modes as well as information about the load and the number of cycles at which near-contact surface cracks completely penetrate the specimen and the extent of any delamination that may develop at the ceramic-epoxy interface. For the internal surface radial cracks, failure is defined when the cracks pop-in because the radial cracks are several millimeters in size which is sufficient to cause the dental prostheses failure. Weibull statistics may be used for data analysis (the current standard method in materials testing). No overlap of the 90% confidence bound is considered as significant.

EXAMPLE 7

Fractography. The fracture surface of randomly selected G/Z/G is analyzed to determine the effect of a glassy phase on crack path in the graded Y-TZP at grain level. A thin layer of carbon is deposited on the fracture surface at a 90° incident angle using a carbon coating unit (EMITECH, K250). The fracture surface is examined in an environmental SEM (Hitachi 3500N) equipped with an energy-dispersive spectroscopy (PGT IMIX) and a backscatter electron imaging detector. Both secondary and back scattered electron imaging modes are utilized to reveal the crack-microstructure interaction. For comparison, crack paths in homogeneous Y-TZP ceramics are examined. In addition, controlled cracks and damage are produced in glass-zirconia graded layers and the dense Y-TZP layer using both Vickers and Hertizan indentations. Crack tip-microstructure interaction and quasiplastic deformation of graded structures are investigated compared to homogeneous Y-TZP. (Guiberteau et al. (1993) *Philosophical Magazine A* 68(5): 1003-16; Guiberteau et al. (1994) *Journal of the American Ceramic Society* 77(7): 1825-31; Cai et al. (1994) *Journal of Materials Research* 9(3): 762-70; Zhang et al. (2003) *Journal of Materials Science* 38(6): 1359-64).

While the present invention has been set forth in terms of specific embodiments thereof, it will be understood that numerous variations upon the invention are now enabled to those skilled in the art, which variations yet reside within the scope of the present teachings. Accordingly the invention is to be broadly construed and limited only by the scope and spirit of the present disclosure.

The invention claimed is:

1. A functionally graded glass/ceramic/glass composite structure comprising an outer residual glass layer, an underlying graded glass-ceramic layer, and a dense interior ceramic wherein a top and a bottom surface of the ceramic are infiltrated with glass.

2. A functionally graded glass/ceramic/glass composite structure in accordance with claim 1, substantially non-susceptible to warppage or bending.

3. A functionally graded glass/ceramic/glass composite structure in accordance with claim 1, wherein the underlying ceramic comprises yttria-tetragonal zirconia polycrystal (Y-TZP).

4. A functionally graded glass/ceramic/glass in accordance with claim 1 wherein the CTE of the glass is substantially the same as the CTE of the yttria-tetragonal zirconia polycrystal (Y-TZP).

5. A functionally graded glass/ceramic/glass in accordance with claim 1 further comprising a veneer on an outer surface.

6. A medical or dental prosthesis comprising a functionally graded glass-ceramic/ceramic/glass-ceramic composite structure or a graded glass-ceramic/ceramic structure wherein a top and a bottom surface of the ceramic are infiltrated with glass.

7. A medical or dental prosthesis according to claim 6 selected from the group consisting of an aesthetic and damage-resistant ceramic orthopedic prosthesis, an orthopedic stem, an orthopedic or dental anchor, an orthopedic or dental implant, a dental prosthesis, and an endodontic post.

8. A medical or dental prosthesis according to claim 6 wherein the ceramic comprises zirconia.

* * * * *